(12) United States Patent
Mielke et al.

(10) Patent No.: US 10,707,504 B2
(45) Date of Patent: Jul. 7, 2020

(54) METHOD FOR FLUSHING A FUEL CELL SYSTEM

(71) Applicant: Daimler AG, Stuttgart (DE)

(72) Inventors: Sascha Mielke, Vancouver (CA); Pere Antoni Pastor Nigorra, Tuebingen (DE); Sven Schmalzriedt, Esslingen (DE); Muhammad Usman, Kirchheim (DE)

(73) Assignee: Daimler AG, Stuttgart (DE)

( * ) Notice: Subject to any disclaimer, the term of this patent is extended or adjusted under 35 U.S.C. 154(b) by 78 days.

(21) Appl. No.: 15/777,001

(22) PCT Filed: Oct. 28, 2016

(86) PCT No.: PCT/EP2016/001799
§ 371 (c)(1),
(2) Date: May 17, 2018

(87) PCT Pub. No.: WO2017/084736
PCT Pub. Date: May 26, 2017

(65) Prior Publication Data
US 2018/0358638 A1 Dec. 13, 2018

(30) Foreign Application Priority Data

Nov. 19, 2015 (DE) .................. 10 2015 015 005

(51) Int. Cl.
*H01M 8/04228* (2016.01)
*H01M 8/04303* (2016.01)
(Continued)

(52) U.S. Cl.
CPC ... *H01M 8/04303* (2016.02); *H01M 8/04164* (2013.01); *H01M 8/04228* (2016.02);
(Continued)

(58) Field of Classification Search
CPC ......... H01M 8/04228; H01M 8/04231; H01M 8/04097
See application file for complete search history.

(56) References Cited

U.S. PATENT DOCUMENTS 7,358,002 B2   4/2008  Kanai et al.
7,641,993 B2   1/2010  Arthur et al.
(Continued)

FOREIGN PATENT DOCUMENTS

DE          603 07 959 T2      1/2007
DE    10 2007 026 330 A1      1/2008
(Continued)

OTHER PUBLICATIONS

PCT/EP2016/001799, International Search Report dated Jan. 23, 2017 (Two (2) pages).

*Primary Examiner* — Olatunji A Godo
(74) *Attorney, Agent, or Firm* — Crowell & Moring LLP

(57) ABSTRACT

A method for flushing a fuel cell system during a power-down cycle includes conveying air by an air conveying device through a cathode space of a fuel cell and releasing the conveyed air through an exhaust air line. An outlet valve is cyclically closed and opened during the power-down cycle, where an opening duration depends on an amount of air that is conveyed and the outlet valve connects an anode discharge line to the exhaust air line. The conveyed air is guided from a delivery side of the air conveying device directly to the exhaust air line at least in part through a system bypass.

9 Claims, 1 Drawing Sheet

(51) Int. Cl.
*H01M 8/04223* (2016.01)
*H01M 8/04746* (2016.01)
*H01M 8/04119* (2016.01)

(52) U.S. Cl.
CPC ... *H01M 8/04231* (2013.01); *H01M 8/04753* (2013.01); *H01M 2220/20* (2013.01)

(56) References Cited

U.S. PATENT DOCUMENTS

| | | | | |
|---|---|---|---|---|
| 2004/0146761 | A1* | 7/2004 | Cargnelli | H01M 8/04029 |
| | | | | 429/413 |
| 2007/0184325 | A1* | 8/2007 | Corey | H01M 8/04156 |
| | | | | 429/444 |

FOREIGN PATENT DOCUMENTS

| | | |
|---|---|---|
| DE | 10 2013 017 543 A1 | 4/2015 |
| DE | 10 2013 226 820 A1 | 6/2015 |

* cited by examiner

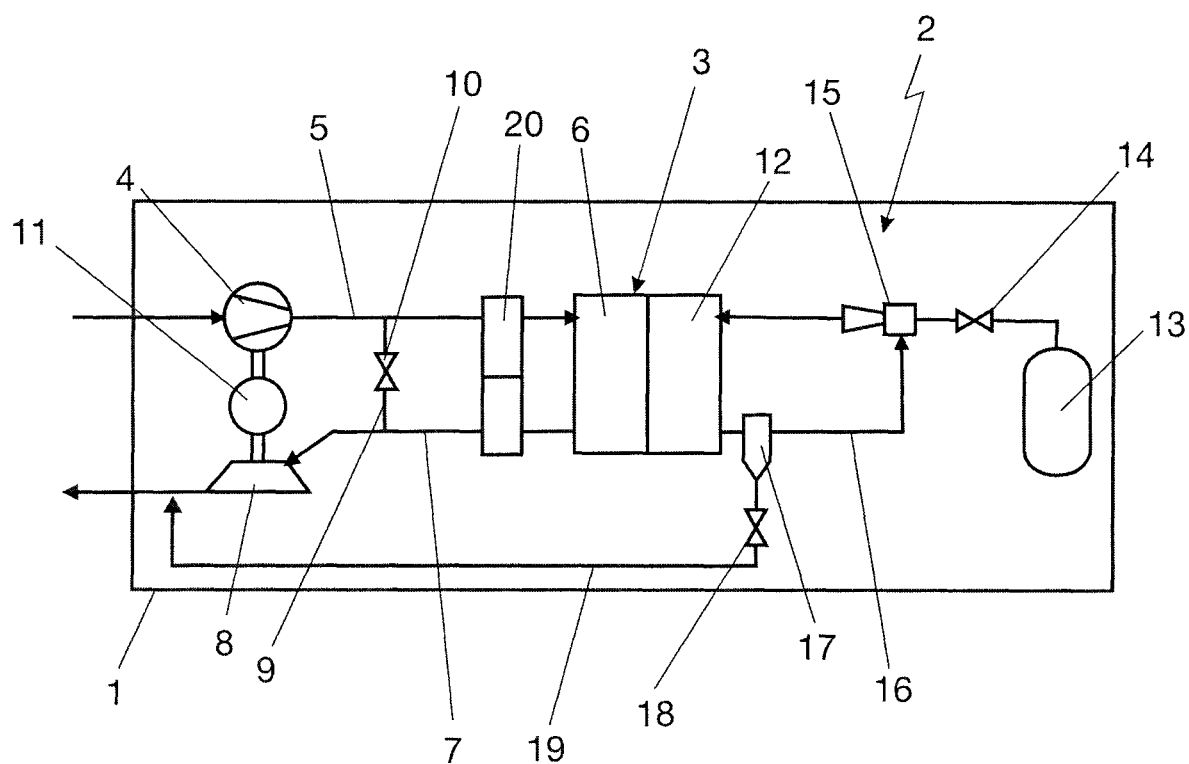

METHOD FOR FLUSHING A FUEL CELL SYSTEM

BACKGROUND AND SUMMARY OF THE INVENTION

The invention relates to a method for flushing a fuel cell system during a power-down cycle.

Flushing fuel cell systems when they are powered down is generally known. As a result, the fuel cell is dried, for example by means of flushing out the cathode side with air, and flushing out the anode side with air or hydrogen, such that, when the temperature later drops to below the freezing point, the fuel cell cannot freeze, or at least not to such a great extent, and can accordingly be restarted more easily and quickly. Even at temperatures above the freezing point, drying out the fuel cell before restarting it, or when it is powered down, has crucial advantages in view of later restarting the cell, because this prevents the active surfaces from being wetted with condensed moisture, and thus prevents the active surfaces from being inhibited. The same applies to distribution channels, which can likewise be inhibited by drops of condensed liquid.

By way of example, reference can be made in this connection to DE 10 2007 026 330 B4, in which, in order to dry out the fuel cell, a flow compressor conveys air in part through the fuel cell itself and in part around the fuel cell in a "system bypass", so as to always allow for sufficient air for diluting the hydrogen that is released on the anode side.

It can be a problem if unexpectedly high concentrations of hydrogen escape and there are therefore correspondingly low volumetric flow rates of air. In the cited document, these values are precisely specified, such that, for safety reasons, operation must always occur using a maximum amount of air, which is highly undesirable with regard to both the energy requirement of the air conveying device and the noise emissions thereof.

DE 603 07 595 T2 describes a method in which the amount of air is adjusted to the hydrogen concentration in the exhaust gas. However, this requires the air conveying device to be controlled in a corresponding manner, so as to always be able to provide a sufficient amount of air, according to the detected hydrogen concentration in the exhaust gas of the anode side. This is a crucial disadvantage in particular in a flow compressor, since, owing to the typically very high speeds thereof and the time required to change the speeds, the control of flow compressors is generally subject to delay, and the amount of air conveyed by the flow compressors, i.e., the air mass or the volumetric flow rate of air, cannot be adjusted very dynamically. A further disadvantage is that the noise emissions of an air conveying device of which the speed continuously changes are significantly higher than those of an air conveying device that operates at a constant speed, as in the document cited above, even if the speed has to be higher in this case.

The object of the present invention is that of providing a method for flushing a fuel cell system when it is powered-down, which method prevents the aforementioned disadvantages and further improves the methods according to the prior art.

In the method according to the invention, the outlet valve is cyclically closed and opened during power-down. The opening duration depends in this case on the amount of air that is conveyed. The outlet valve is therefore cyclically opened and closed during the entire power-down procedure of the fuel cell system, during which procedure air is conveyed by the air conveying device. The fact that the cyclical opening and closing is adjusted depending on the amount of air that is conveyed, i.e., a measured air mass or a measured volumetric flow of air, or even an amount of air estimated from the speed and/or driving power of the air conveying device, for example, makes it possible to achieve a maximum opening duration of the valve for the amount of air that is conveyed, without exceeding the critical limit values of hydrogen emissions. A maximum opening duration of the valve that is suitable for the corresponding amount of air can thus be achieved by adjusting the opening duration of the outlet valve. This results in the maximum possible amount of water being discharged from the anode side of the fuel cell.

A further crucial advantage of the method according to the invention is that the air, which is conveyed by the air conveying device and which correspondingly dilutes the emissions from the anode side in the region of the exhaust air line, has previously passed through the cathode side of the fuel cell and also dried out the cathode side, such that the entire structure of the fuel cell is safely and reliably dried during the power-down procedure.

At the same time, it is ensured that the hydrogen concentration in the region of the anode side of the fuel cell is as high as possible after the power-down cycle, since inert gases are also released through the opened valve. A hydrogen concentration of this type, which is as high as possible, at the anode side is a crucial advantage for the system that is later powered down, because restarting the fuel cell system when hydrogen is present at the anode side preserves the fuel cell much more effectively than restarting when oxygen from the air is present at the anode side. The "H2 protection time" is thus extended.

In order to achieve this as effectively as possible, according to an advantageous development of the concept, when the amount of air is larger, the opening duration is extended, and when the amount of air is smaller, the opening duration is correspondingly reduced, in order to achieve, on average, sufficient dilution, in each case, of the hydrogen that is typically also released at the anode side.

According to a very advantageous development of the method according to the invention, the conveyed air can also be conveyed, at least in part through a system bypass, from the delivery side of the air conveying device directly to the intake side of the turbine in the exhaust air line. A system bypass, which is typically present in any case, being used in this way reduces the amount of air which has to flow through the cathode side of the fuel cell, and the amount of air which optionally flows through other structures, such as humidifiers and the like. As a result, the pressure losses, and thus the amount of energy required to provide the air are reduced during the power-down procedure. In this case, appropriately positioning a valve device in the system bypass can ensure that a sufficient amount of air for drying flows through the cathode side and optionally through the humidifier, and also that there is a sufficient amount of air available for diluting any hydrogen emissions that may be present in the exhaust air line.

Another advantage of decreasing the amount of air that is guided through the cathode side of the fuel cell is that the voltage of the individual cells is typically limited during the power-down procedure. It is therefore necessary to continue to draw some load from the fuel cell. The limit on the voltage of the individual cells allows corrosion within the cells to be reduced, which has a positive effect on the service life of the fuel cell. The larger the amount of air in the cathode side, the more heavily the fuel cell has to be loaded with a suitable electrical load. At the same time, however, the increasing loading of the fuel cell produced more water, which is counter to the aim of drying the fuel cell. This problem can be mitigated by reducing the air mass that is guided through the cathode side by means of the system bypass.

Furthermore, according to another, very favorable embodiment of the method according to the invention, the air conveying device can also be operated at a constant speed. In particular, such a use of the air conveying device operated at a constant speed, and, according to the advantageous development described above, it being possible to adjust, if necessary, the amount of air flowing through the cathode side by means of the system bypass, allows a marked reduction in the disruptive acoustic emissions and in the vibrations caused by the air conveying device. Specifically, constant operation at a specified speed produces considerably less noise and fewer vibrations than would be the case if the speed of the air conveying device were continuously adjusted. Moreover, a sound absorber can ideally be provided on the air conveying device when it is operated at a constant speed, such that the noise emissions are minimized. At the same time, compared to dynamically changing operation, operation at a constant speed reduces the energy requirement of the air conveying device.

Further advantageous embodiments of the method and of the fuel cell system are explained by an embodiment which is described in greater detail below with reference to the drawing.

BRIEF DESCRIPTION OF THE DRAWING

The single accompanying drawing shows a schematic fuel cell system for carrying out the method according to the invention in a vehicle.

DETAILED DESCRIPTION OF THE DRAWING

The single appended drawing schematically shows a vehicle 1. A fuel cell system 2 is located in the vehicle 1, which system is intended to be used for providing electrical driving power for the vehicle 1. In this case, a fuel cell, denoted by reference sign 3, forms the core of the fuel cell system 2, which cell should be constructed as a stack of individual cells, for example using PEM technology. Air is supplied to the fuel cell 3 by an air conveying device 4, which can preferably be designed as a flow compressor, by means of a supply air line 5. The air reaches a cathode space 6 of the fuel cell 3, which is indicated, by way of example, inside the fuel cell 3. The exhaust air then reaches an exhaust turbine, denoted by reference sign 8 in the embodiment shown here, via an exhaust air line 7, and from there reaches the surroundings. A gas/gas humidifier 20 can be arranged, in a manner known per se, between the supply air line and the exhaust air line. The hot and dry supply air in the supply air line 5 is humidified in the humidifier 20 by the humid exhaust air in the exhaust air line 7. Furthermore, the supply air line 5 can be connected to the exhaust air line 7 by means of a bypass line 9 comprising a bypass valve 10. This structure consisting of the bypass line 9 and the bypass valve 10 is also referred to as a system bypass, and is also fundamentally known as such from the prior art.

In the embodiment shown here, the air conveying device 4 is connected to the exhaust turbine 8 and to an electric motor 11 by means of a common shaft. This structure is also referred to as an electric turbocharger (ETC) or a motor-assisted turbocharger. The function thereof is to allow the air conveying device 4 to make the air available to the fuel cell 3 as source of oxygen. When exhaust air is present in the exhaust air line 7, some of the energy from the exhaust air can be recovered by depressurizing the exhaust air in the exhaust turbine 8. The energy can be used to assist the driving of the air conveying device 4. The electric motor 11 typically supplies the rest of the necessary driving power. If, in specific situations, more power is recovered in the region of the exhaust turbine 8 than is required by the air conveying device 4, the electric motor 11 can also be operated as a generator.

The anode side of the fuel cell 3, which has a denoted anode space 12, is supplied with hydrogen. In the embodiment shown here, the hydrogen originates from a compressed gas reservoir, denoted by reference sign 13, and is supplied to the anode space 12 by means of a control and metering valve 14 and a gas jet pump 15, which will be explained in more detail below. Unused remaining hydrogen, together with inert gases that were present in the stored hydrogen or which have diffused from the cathode space 6 into the anode space 12, as well as product water that has been produced in the anode space 12, is returned to the gas jet pump 15 by means of a recirculation line 16. In the gas jet pump 15, the fresh hydrogen supplied by the metering valve 14 ensures that the gas mixture is drawn into the recirculation line 16 and delivered back to the anode space 12, mixed with the fresh hydrogen, by means of the effects of negative pressure and momentum exchange. This structure is also known from the prior art, and is referred to as an anode circuit.

A water separator, denoted by reference sign 17, is located in the recirculation line 16, in particular at the point on the anode side of the fuel cell system 2 that is lowest when the system is used as intended. The water separator is used to separate and collect water from the gas flow that flows in the recirculation line 16. During normal operation of the fuel cell system 2, the water is occasionally released through a discharge line 19 by opening an outlet valve 18. Since a certain amount of hydrogen and inert gases is always released as well, the discharge line 19 leads into the exhaust air line 7. In this case, the discharge line can lead into the exhaust air line 7 either upstream or downstream of the exhaust turbine 8. In order to protect the exhaust turbine 8 from droplets which can very easily damage the fast-moving turbine, the discharge line can ideally lead into the exhaust air line 7 downstream of the exhaust turbine 8 in the flow direction of the exhaust air, as is also shown in the embodiment. Moreover, a further water separator can be provided in the exhaust air line 7 upstream of the exhaust turbine 8 in the flow direction of the exhaust air. However, this is generally known to a person skilled in the art, and has therefore not been shown.

After normal operation of the fuel cell system 2 has ended, i.e., in particular when a driver of the vehicle 1 parks the vehicle, the fuel cell, when it is powered-down, is then brought into a defined state by means of a power-down cycle or shut-down procedure, in order to be restarted later. Since condensed water in the fuel cell 3 can freeze at temperatures below freezing point, and since condensed water in the fuel cell could wet, and thus inhibit, regions that are important for the function of the fuel cell, such as active surfaces, gas guiding channels and the like, the fuel cell 3 and the periphery of the fuel cell 3 are typically also dried as part of the power-down procedure. This is ideally carried out by operating the air conveying device 4 at a constant speed, and thus providing a corresponding air mass flow. When the system bypass valve 10 is slightly open, the air mass flow is then guided in part through the humidifier 20 and the cathode space 6, and in part through the system bypass line, directly from the supply air line 5 to the exhaust air line 7. The entire air mass of the entire conveyed air flow is then available, to be released into the surroundings, in the region of the exhaust turbine 8 and downstream of the exhaust turbine. In this process, the cathode space 6 of the fuel cell 3, the humidifier 20, the supply air line and the exhaust air line are all correspondingly dried out by the air that flows through the humidifier 20 and the cathode space 6 of the fuel cell 3, in order to thus safely and reliably eliminate the risk of liquid condensing, and in particular of the liquid subsequently freezing.

The anode side of the fuel cell system 2 is likewise flushed out. For this purpose, the pressure regulating and metering valve 14 is opened at least in part, such that hydrogen can flow through the anode circuit via the gas jet pump 15. Any water that may be present is discharged in the process and collects in the water separator 17. Since there is, in any case, a certain concentration of hydrogen in the anode circuit, it must be expected that opening the outlet valve 18 will result in hydrogen being emitted into the surroundings. For this reason, the volume released through the outlet valve flows through the discharge line 19 into the exhaust air line 7 and is diluted by the air contained therein. In order to then ensure that there is not an undesirably high concentration of hydrogen in the exhaust air flowing into the surroundings, the outlet valve 18 is cyclically opened and closed during the power-down process described here. In this case, cyclical opening and closing of this type has the advantage that pressure pulses build up, resulting in a very effective discharge of water, in particular from the region of the water separator 17 and of the recirculation line 16.

At the same time, the opening duration is then adjusted depending on the air mass conveyed by the air conveying device 4, such that it is possible to ensure, in all cases, that the conveyed air mass is sufficient to dilute the maximum expected amount of released hydrogen to such an extent that there are no critical hydrogen emissions into the surroundings. In practice, this results in a longer opening duration of the outlet valve 18 being permitted in the case of a larger air mass than in the case of a smaller air mass. It can thus be ensured, in all cases, that the maximum opening time of the outlet valve 18 that is possible for the conveyed air mass is achieved during the power-down procedure. The maximum opening time ensures the maximum possible discharge of water from the anode side, and at the same time allows the maximum amount of undesired inert gases to be discharged from the anode side. This then results in an anode side which is dried out as much as possible, and which has the highest possible hydrogen concentration in the entire anode circuit. A very good H2 protection time is thus achieved, and, at the same time, the risk of the anode side of the fuel cell 3 freezing is minimized.

If the air conveying device 4 has a constant speed, noise emissions can also be minimized, and the vibrations that are introduced into the system can be reduced compared to a dynamic operation of the air conveying device 4.

The method is suitable in particular for use in a fuel cell system 2 in a vehicle 1, since in this case the fuel cell system 2 is very frequently powered down and restarted, in particular even under adverse ambient conditions such as temperatures below freezing point. In principle, however, the method can also be used in fuel cell systems outside a vehicle.

The invention claimed is:

1. A method for flushing a fuel cell system during a power-down cycle, comprising the steps of:
   conveying air by an air conveying device through a cathode space of a fuel cell and releasing the conveyed air through an exhaust air line;
   cyclically closing and opening an outlet valve located in a recirculation line used to return hydrogen to an anode space during the power-down cycle, wherein an opening duration depends on an amount of air that is conveyed and wherein the outlet valve connects an anode discharge line to the exhaust air line; and
   guiding the conveyed air from a delivery side of the air conveying device directly to the exhaust air line at least in part through a system bypass.

2. The method according to claim 1, wherein the opening duration is extended when a larger amount of air is conveyed and wherein the opening duration is reduced when a smaller amount of air is conveyed.

3. The method according to claim 1, wherein the air conveying device is operated at a constant speed during the power-down cycle.

4. The method according to claim 1 further comprising the step of returning exhaust gas from the anode space of the fuel cell to the anode space by the recirculation line and a recirculation conveying device.

5. The method according to claim 1, wherein the anode discharge line branches off at a point on an anode side of the fuel cell system that is lowest.

6. The method according to claim 5, wherein a water separator is disposed on the anode side of the fuel cell system in a region where the anode discharge line branches off.

7. The method according to claim 1, wherein the air conveying device is a flow compressor.

8. The method according to claim 1, wherein the air conveying device is operatively connected to an exhaust turbine and to an electric motor.

9. The method according to claim 1, wherein during normal operation, the fuel cell system provides driving power in a vehicle.

* * * * *